United States Patent
Ye et al.

(10) Patent No.: US 12,028,289 B2
(45) Date of Patent: Jul. 2, 2024

(54) PHYSICAL SIDELINK FEEDBACK CHANNEL (PSFCH) RANGE EXTENSION WITH LONG PSFCH FORMAT

(71) Applicant: Apple Inc., Cupertino, CA (US)

(72) Inventors: Chunxuan Ye, San Diego, CA (US); Dawei Zhang, Saratoga, CA (US); Wei Zeng, San Diego, CA (US); Haijing Hu, Beijing (CN); Haitong Sun, Irvine, CA (US); Zhibin Wu, Los Altos, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 17/437,093

(22) PCT Filed: Aug. 5, 2020

(86) PCT No.: PCT/CN2020/107026
§ 371 (c)(1),
(2) Date: Sep. 8, 2021

(87) PCT Pub. No.: WO2022/027291
PCT Pub. Date: Feb. 10, 2022

(65) Prior Publication Data
US 2022/0311582 A1 Sep. 29, 2022

(51) Int. Cl.
*H04W 4/40* (2018.01)
*H04L 1/1812* (2023.01)
*H04L 5/00* (2006.01)

(52) U.S. Cl.
CPC .......... *H04L 5/0055* (2013.01); *H04L 1/1812* (2013.01); *H04L 5/0012* (2013.01); *H04W 4/40* (2018.02)

(58) Field of Classification Search
CPC ... H04L 5/0055; H04L 1/1812; H04L 5/0012; H04L 1/1861; H04L 1/1864; H04W 4/40; H04W 92/18; H04W 76/14
See application file for complete search history.

(56) References Cited

U.S. PATENT DOCUMENTS 10,834,704 B2 * 11/2020 Huang .............. H04W 72/0453
10,925,039 B2 * 2/2021 Kung .................... H04W 76/27
(Continued)

FOREIGN PATENT DOCUMENTS

CN         110545533 A       12/2019

OTHER PUBLICATIONS

International Search Report for PCT Patent Application No. PCT/CN2020/107026; dated Apr. 27, 2021.
(Continued)

*Primary Examiner* — Julio R Perez
(74) *Attorney, Agent, or Firm* — Kowert, Hood, Munyon, Rankin & Goetzel, P.C.

(57) ABSTRACT

Embodiments are presented herein of apparatuses, systems, and methods for performing vehicle-to-everything (V2X) sidelink communications with hybrid automatic repeat request (HARQ) feedback include using a new long physical sidelink feedback channel (PFSCH) format, i.e., PFSCH format 1, to assign feedback resources for various sidelink communication networks and environments where the existing or legacy sidelink feedback format, i.e., the short PFSCH format, referred to herein as PFSCH format 0, is insufficient to support effective acknowledgements (ACKs) and non-acknowledgements (NACKs) due to the limited nature of the format design.

20 Claims, 8 Drawing Sheets

(56) References Cited

U.S. PATENT DOCUMENTS

| | | | |
|---|---|---|---|
| 11,627,556 B2* | 4/2023 | Lee | H04L 1/1812 370/329 |
| 2019/0174530 A1* | 6/2019 | Kim | H04W 72/12 |
| 2020/0235868 A1* | 7/2020 | Yu | H04W 4/08 |
| 2020/0322099 A1* | 10/2020 | Park | H04L 1/1861 |
| 2022/0224491 A1* | 7/2022 | Salim | H04L 1/1861 |
| 2022/0311582 A1* | 9/2022 | Ye | H04W 76/14 |
| 2023/0057486 A1* | 2/2023 | Ye | H04L 1/1896 |

OTHER PUBLICATIONS

Huawei et al. "Sidelink physical layer structure for NR V2X"; 3GPP TSG RAN WG1 Meeting #97 R1-1906007; Reno, USA, May 13-17, 2019.

Huawei et al. "PSFCH formats for NR V2X"; 3GPP TSG RAN WG1 Meeting #96bis R1-1905899; Xi'an, China; Apr. 8-12, 2019.

Huawei et al. "Design and contents of PSCCH and PSFCH"; 3GPP TSG RAN WG1 Meeting #97 R1-1906596; Reno, USA; May 13-17, 2019.

Extended European Search Report for EP Patent Application No. 20948056.5; dated Jun. 7, 2023.

Interdigital Inc "Discussion on Physical Layer Procedures for NR V2X Sidelink"; 3GPP TSG RAN WG1 #96 R1-1902596; Feb. 2019.

Office Action for JP Patent Application No. 2023-507689; dated Dec. 21, 2023.

Huawei et al. "Sidelink physical layer structure for NR V2X", 3GPP TSG RAN WG1 Meeting #98 R1-1908039; Aug. 26, 2019.

Nokia et al. "Discussion on physical layer structure for sidelink", 3GPP TSG RAN WG1 #98 R1-1908282; Aug. 26, 2019.

ITL "Physical layer procedure for NR V2X"; 3GPP TSG RAN WG1 #99 R1-1912372; Nov. 18, 2019.

* cited by examiner

PHYSICAL SIDELINK FEEDBACK CHANNEL (PSFCH) RANGE EXTENSION WITH LONG PSFCH FORMAT

PRIORITY CLAIM INFORMATION

This application is a national stage application of International Application No. PCT/CN2020/107026, filed on Aug. 5, 2020, titled "Physical Sidelink Feedback Channel (PSFCH) Range Extension with Long PSFCH Format", which is hereby incorporated by reference in its entirety.

FIELD

The present application relates to wireless devices, and more particularly to apparatuses, systems, and methods for wireless devices to perform sidelink communication in vehicle-to-everything (V2X) wireless cellular communications and other potential Internet of Things (IoT) usage cases.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), and other wireless communications devices for various purposes, such as to coordinate traffic activity, facilitate autonomous driving, and perform collision avoidance. As part of the V2X standardization in 3GPP and New Radio (NR), direct communications between two user equipments (UEs), without signal relay through a centralized base station, has become increasingly important. This may also be referred to as Device-to-Device (D2D) or Peer-to-Peer (P2P) communications. 3GPP sidelink transmissions have demonstrated importance in the Long-Term Evolution (LTE) Advanced (LTE-A) for public safety and vehicle-to-everything (V2X) services. With this successful development in LTE-A, the evolution of sidelink transmissions continues in 3GPP New Radio (NR), which renders sidelink communications an inevitable component in addition to more traditional cellular topologies using downlink and uplink communications with base stations. Sidelink is targeted at offering low latency, high reliability and high throughput V2X services for advanced driving use cases. A number of new sidelink functions not provided in the LTE-A are supported in NR, including the feedback channel, grant-free access, enhanced channel sensing procedure, and new control channel design. Accordingly, improvements in the field in support of such development and design are desired.

SUMMARY

Embodiments are presented herein of apparatuses, systems, and methods for performing sidelink wireless cellular communications utilizing an enhanced physical sidelink feedback channel for improved coverage.

Notably, the various embodiments of the present invention related to techniques for enhancing sidelink wireless communications in direct communications between two user equipment (UEs) without signal relay through a base station. The evolution of sidelink transmissions continues in 3GPP New Radio (NR). As mentioned, a number of new sidelink functions not provided in the LTE-A are being supported in NR, including the feedback channel, grant-free access, enhanced channel sensing procedure, and new control channel design. To fully comprehend these new functions, the embodiments disclosed herein relate to 3GPP NR sidelink transmissions, including the physical layer structure, resource allocation mechanisms, resource sensing and selection procedures, synchronization, and quality-of-service (QoS) management. Furthermore, embodiments contemplate enhancements to a new control channel design. As NR sidelink transmissions have been regarded as a foundation to provide advanced services in addition to V2X in future releases (e.g., advanced relay), potential enhancements are also discussed to serve the urgent demand in this ongoing work.

Transmissions on sidelink component carriers may be acknowledged independently, using an acknowledgement or negative acknowledgement (ACK/NACK) message in reply by a receiving UE. This is commonly referred to as hybrid-automatic repeat request (HARQ) in LTE and NR, where on each component carrier, transport blocks of data being received are acknowledged by transmitting one or two bits on the return link to the transmitting device. In the absence of spatial multiplexing, there is only a single transport block within a transmit time interval (TTI) and consequently only a single acknowledgment bit is required in response. However, if the transmission uses spatial multiplexing, there are two transport blocks per TTI, each requiring its own hybrid-ARQ acknowledgment bit. The total number of bits required for hybrid-ARQ acknowledgments thus depends on the number of component carriers and the transmission mode for each of the component carriers. As each sidelink component carrier is scheduled separately from its own PSCCH, the hybrid-ARQ process numbers are signaled independently for each component carrier on specified areas of the physical sidelink feedback channel (PSFCH). In NR, there is presently only the basic acknowledgment format referred to as "format 0" or short format of acknowledgement (PSFCH). This non-adaptive and static format is insufficient to accommodate all the various types of networking using sidelink communications that a UE may encounter. Moreover, the static format can cause problems in fragmentation and collision of retransmissions and therefore a more adaptive variable format to express ACK/NACKs is desirable.

Embodiments may relate to a wireless device, such as a UE, which may configure radio resources for a physical sidelink feedback channel (PSFCH) to transmit acknowledgment (ACK) or "negative" or "non"-acknowledgement (NACK) messages over a sidelink feedback channel using a "long" PSFCH format resource configuration. The wireless device may assign frequency resources for use in the long PSFCH format from one of: a) remaining unused physical resource blocks (PRBs) of a resource pool used for sidelink transmission of a physical sidelink control channel (PSCCH) and a physical sidelink shared channel (PSSCH); b) a last several sub-channels of the resource pool; or c) both high PRBs and low PRBs of the resource pool. The long PSFCH format may be referred to as PSFCH format 1 and may comprise 1 or 2 bit information on HARQ ACK. In addition, the PSFCH format 1 may fit in a single slot of a radio frame in a time domain and is one PRB in a frequency domain.

The wireless device may further determine resource mapping between the PSSCH and the long PSFCH format configuration in various manners. For example, when a number of sub-channels for the PSSCH is equal to a number of PSFCHs in a slot, one-to-one mapping may be used in the frequency domain such that, when a PSSCH uses i-th sub-channels, then the i-th PSFCH is used for hybrid automatic repeat request (HARQ) feedback. Further, when the number of sub-channels for the PSSCH is not equal to the number of PSFCHs in the slot, the wireless device may index the PSFCH resources by one of frequency first, time second indexing, time first, frequency second indexing, or frequency first, time second and code indexing third.

The wireless device may further operate to determine that the long PSFCH format should be used by various signaling in sidelink control information (SCI) present in the sidelink control channel (PSCCH) as well as potential measurements of signals received by the wireless device.

In certain embodiments, PSFCH format 1 is exclusively used in resource configuration.

The wireless device may further configure PSFCH format 1 resources jointly with PSFCH format 0 resources in the same resource pool used for sidelink transmission of a physical sidelink control channel (PSCCH) and a physical sidelink shared channel (PSSCH).

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
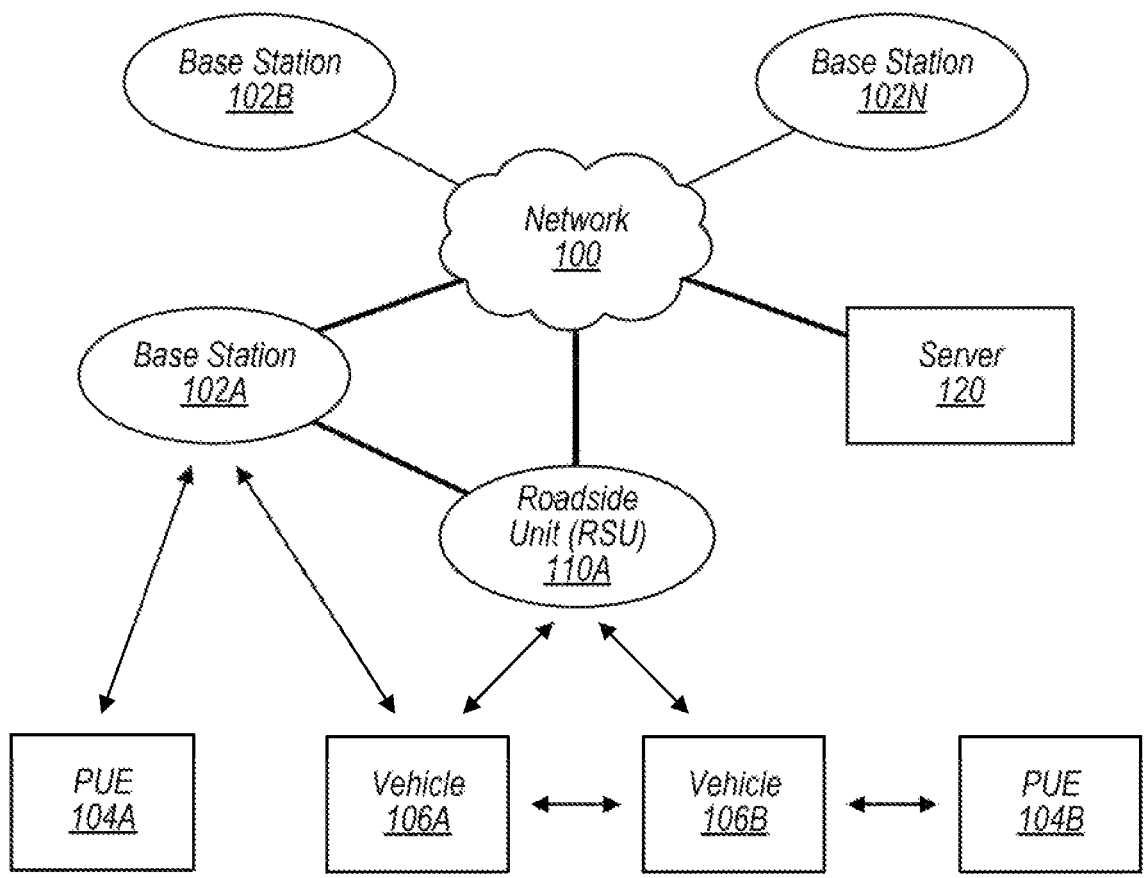
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems or devices that are mobile or portable and that perform wireless communications. Examples of UE devices include mobile telephones or smartphones (e.g., iPhone™, Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements include, for example, processors and associated memory, portions or circuits of individual processor cores, entire processor cores, individual processors, circuits such as an ASIC (Application Specific Integrated Circuit), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing said wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

In 3GPP Releases 12 to 15, sidelink transmissions were designed based on the air interface of LTE-A, which however may not fulfill the service requirements imposed by the International Mobile Telecommunications-2020 (IMT-2020). To migrate to the fifth generation (5G) network, 3GPP subsequently launched the standardization progress of NR sidelink transmissions in Release 16 in June 2018. Although the major scenario of Release 16 NR sidelink transmissions also targets at V2X, the services are no longer limited to the cooperative awareness messaging (CAM) and the decentralized environmental notification (DENM) utilized in V2X. Instead, sustaining the next generation driving use cases (including advanced driving, vehicle platooning, extended sensors, and remote driving) are the major goals. These use cases demand low-latency, high-reliability and high-throughput transmissions, as well as a high connection density. To fulfill these new requirements, four new enhancements were introduced to NR sidelink transmissions as follows. Not only broadcast but also unicast and groupcast are supported in sidelink transmissions. For unicast and groupcast, the physical sidelink feedback channel (PSFCH) was newly introduced for a receiving UE to reply decoding status to a transmitting UE. Furthermore, to improve the latency performance, grant-free transmissions that are adopted in NR uplink transmissions are also provided in NR sidelink transmissions. Additionally, to alleviate resource collisions among different sidelink transmissions launched by different UEs, enhanced channel sensing and resource selection procedures were added which required a new design of physical sidelink control channel. Lastly, in order to achieve a high connection density and congestion control, a QoS management feature is supported in NR sidelink transmissions. Although Release 16 sidelink transmissions solely focus on V2X, 3GPP is planning further enhancements to extend the sidelink scenarios to interactive games, enhanced public safety, enhanced V2X, advanced relay, and other usage scenarios. Accordingly, while explained in context of V2X networking, the various embodiments are not limited to any particular usage model or network.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer (P2P) communications may be referred to as "sidelink communications" and may utilize a "sidelink" interface such as the PC5 interface in the case of some LTE embodiments. In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. For example, NR V2X sidelink communication techniques can also be used to perform device-to-device communications, at least according to some embodiments. Note also that some user devices in a V2X system (e.g., PUE 104A, as one possibility) may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an 'eNodeB', or eNB. Note that if the base station 102A is implemented in the context of NR, it may alternately be referred to as a 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may be capable of communicating with the base station 102A. The user devices shown, i.e., user devices 104A, 104B, 106A, and 106B may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a "sidelink" technology such as LTE PC5 or NR V2X sidelink communication techniques.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

FIG. 2

Figure 2:
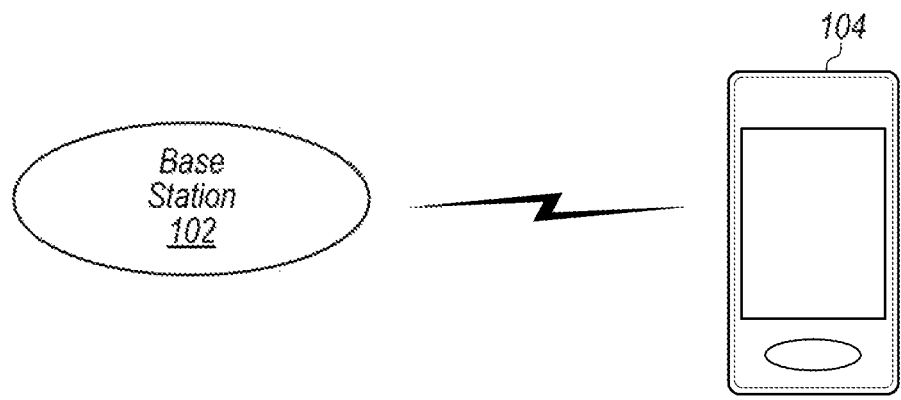
FIG. 2 illustrates a base station in communication with a user equipment (UE) device, according to some embodiments.

FIG. 2 illustrates a user equipment (UE) device 104 (e.g., one of the PUEs 104A or 104B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor (processing element) that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array), an integrated circuit, and/or any of various other possible hardware components that are configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
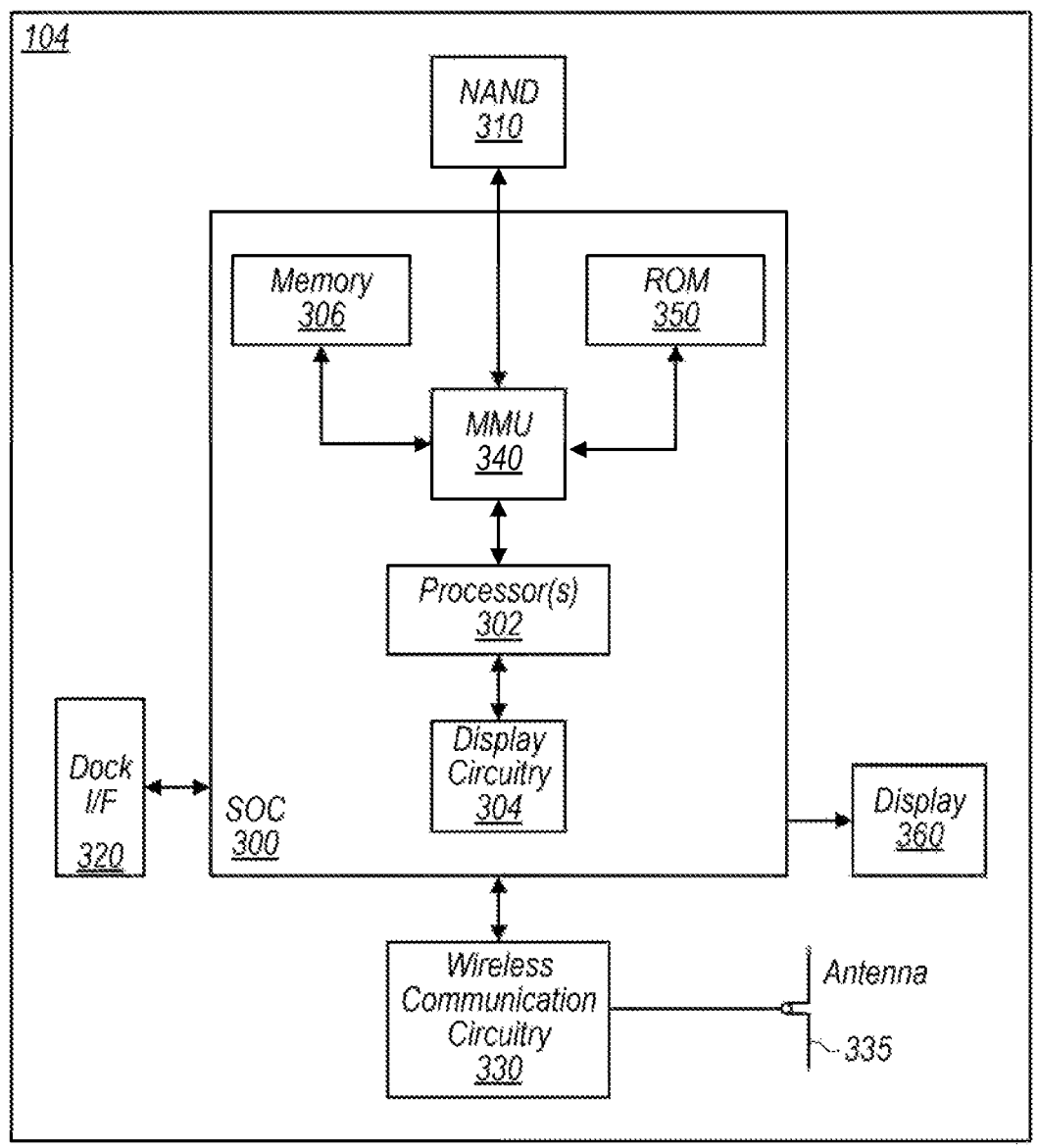
FIG. 3 is an example block diagram of a UE, according to some embodiments.

FIG. 3—UE Block Diagram

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing V2X sidelink communications, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
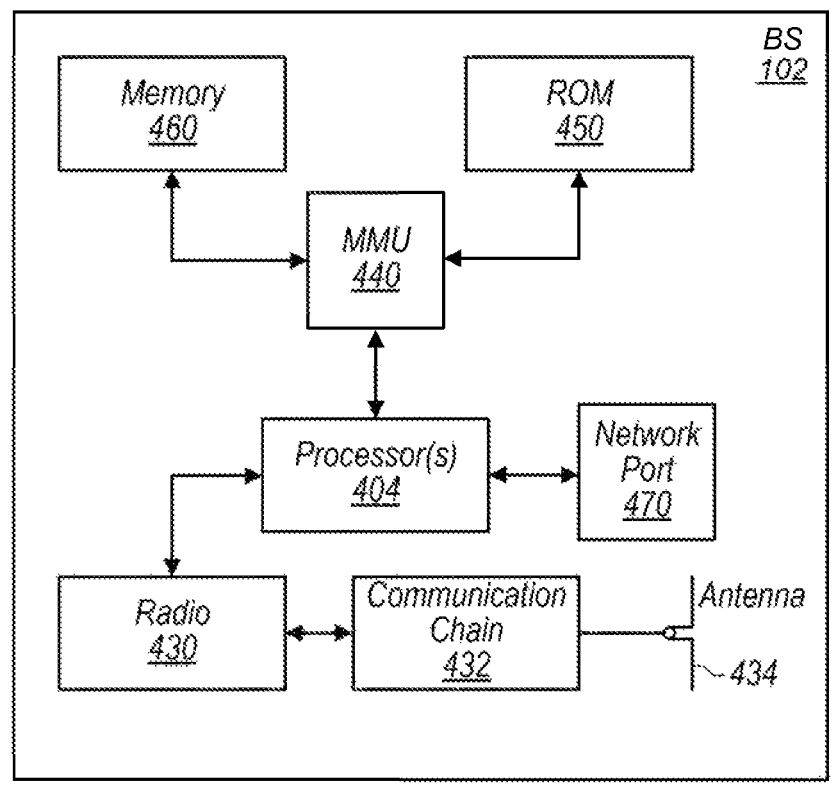
FIG. 4 is an example block diagram of a base station, according to some embodiments.

FIG. 4—Base Station Block Diagram

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

V2X Sidelink Communication

According to various embodiments, sidelink communications represent a special kind of communication mechanism between devices that is not carried through a base station, e.g., through eNB/gNB. In other words, the devices communicate with each other without that communication going through a base station. In one sense, the devices may be said to be communicating with each other directly, i.e., D2D or peer-to-peer P2P communications are utilized. As mentioned previously, accommodation of such communication, however, may require a new physical layer design.

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, such as vehicle platooning, extended sensors, advanced driving, and remote driving.

In LTE V2X, broadcast sidelink communications are supported, in which maintenance of the sidelink connection is performed using keep-alive messages communicated between upper layers (e.g., application layers, non-access stratum layers, etc.) of the wireless devices in communication. NR V2X supports unicast and groupcast sidelink communications, e.g., in addition to broadcast sidelink communications.

In order to support such V2X or D2D sidelink communications, a variety of communication channels (e.g., control channels, data channels) may need to be provided. Accordingly, various possible techniques supporting V2X sidelink communication, including a variety of possible V2X channel design features and considerations, are proposed herein. Various embodiments herein propose a new physical sidelink feedback channel (PSFCH) format and modifications to support range extension of sidelink transmissions in NR. In order to discuss the inventive embodiments, some basic considerations of NR formats for V2X are included as follows:

In NR Release 16, logical, transport and physical layer parameters for sidelink transmissions were defined. The physical layer includes a physical sidelink (SL) control channel (PSCCH), a physical SL shared channel (PSSCH) and a physical SL feedback channel (PSFCH). The Physical SL Control Channel (PSCCH) is the equivalent to the downlink control channel (PDCCH) in cellular traffic over interface Uu. It contains part of the Sidelink Control Information (SCI) provides the information the receiving UE requires in order to be able to receive and demodulate the PSSCH.

PSSCH: The PSSCH is transmitted by a sidelink transmitting UE, which conveys sidelink transmission data, system information blocks (SIBs) for radio resource control (RRC) configuration, and a part of the sidelink control information (SCI).

PSFCH: The PSFCH is transmitted by a sidelink receiving UE for unicast and groupcast, which conveys 1-bit information over 1-RB for the HARQ acknowledgement (ACK) and the negative ACK (NACK). In addition, channel state information (CSI) is carried in the medium access control (MAC) control element (CE) over the PSSCH instead of the PSFCH.

PSCCH: When the traffic to be sent to a receiving UE arrives at a transmitting UE, a transmitting UE should first send the PSCCH, which conveys a part of SCI to be decoded by any UE for the channel sensing purpose, including the reserved time-frequency resources for transmissions, demodulation reference signal (DMRS) pattern and antenna port, etc. For the PSCCH, the SCI is transmitted using quadrature phase shift keying (QPSK)

Central to sidelink transmission and reception is the concept of Resource Pools (RP). A resource pool is a set of resources assigned to the sidelink operation. A resource pool may comprise the subframes and the physical resource blocks (PRB) within. There are two modes of resource assignment: In Mode 1, the eNB indicates the resources to be used for transmission, including the resources within an RP. In Mode 2, the UE selects an RP and the resources therein from a set of assigned pools.

Sidelink Control Information (SCI) Payloads/Separate to 2 Parts (or Stages)

SCI Stage 1

Stage 1 SCI includes in its payload: Priority; PSSCH frequency resource assignment; PSSCH time resource assignment; Resource reservation period; DMRS pattern; SCI stage 2 format; beta offset indicator; Number of DMRS port; modulation and coding scheme (MCS); MCS table index; PSFCH overhead indication; and Reserved bits. In some embodiments, a single SCI stage 1 format may be permitted per resource pool. Stage 1 SCI may be carried in the physical sidelink control channel (PSCCH).

SCI Stage 2

There are 2 formats for stage 2 SCI including: Format A for unicast, groupcast HARQ option 2, broadcast and its payload includes an HARQ process number; New data indicator; Redundancy version; Source ID; Destination ID; HARQ feedback enabling/disabling indicator; /Cast type indicator; and CSI request; and Format B for groupcast HARQ option 1, a/nd its payload may include: HARQ process number; New data indicator; Redundancy v/ersion; Source ID; Destination ID HARQ feedback enabling/disabling indicato/r; Zone ID; and Communication range requirement. SCI stage 2 is carried in the physical/sidelink shared channel (PSSCH)

PSFCH Format

The PSFCH format may be a sequence-based short format. The PSFCH format may have the same sequence of a physical uplink control channel (PUCCH) format 0. In the time domain, the resources include a repetition of PSFCH format to two consecutive symbols. The first symbol can be used for AGC training and another symbol is used for GAP (i.e., Tx/Rx switch) right after PSFCH transmission. In the frequency domain, the short format is a single PRB, i.e., the whole sub-channel is not used.

PSFCH Resource

Each PSFCH may be mapped to a time, frequency and code resource. In the time domain, a slot offset is 2 or 3 from its corresponding PSSCH and the resource pool may be preconfigured. In the frequency domain, the resource may be determined by the corresponding PSSCH starting sub-channel index and slot index. A code domain resource is explored for groupcast HARQ feedback Option 2.

Embodiments of the present invention may also extend the physical sideband feedback channel (PSFCH) format to extend coverage in narrowband device-to-device wireless communication networks such as Off Grid Radio Systems (OGRS) and 3GPP Narrowband Internet-of-Things (NB-IoT) networking systems. Narrowband Internet of Things (NB-IoT) is a Low Power Wide Area Network (LPWAN)

radio technology standard developed by 3GPP to enable a wide range of cellular devices and services. The specification was frozen in 3GPP Release 13 (LTE Advanced Pro), in June 2016. NB-IoT focuses specifically on indoor coverage, low cost, long battery life, and high connection density. NB-IoT uses a subset of the LTE standard, but limits the bandwidth to a single narrow-band of 200 kHz. It uses OFDM modulation for downlink communication and SC-FDMA for uplink communications.

Off Grid Radio System (OGRS) considerations:

An OGRS alternative design in 3GPP may need to consider Maximum Coupling Loss (MCL)>160 dB, and a Pathloss that can be above 140 dB, based on the 3GPP model in TS 37.885 at 2 km at 900 MHz. In NR, UE design may be targeted for a link budget of 140 dBi. However, a coverage loss of greater than 20 dB should be considered, at least due to the gNodeB (gNB)/UE receive antenna difference. With an Antenna gain difference of 12/21 dB, a gNB antenna gain figure is about 8/17 dB with a UE antenna gain of −4 dBi. With a noise figure loss of 4 dB difference, a gNB noise figure is about 5 dB and a UE noise figure is about 9 dB.

For 3GPP LTE, Narrowband Internet of Things (NB-IoT) solutions can be considered for NR sidelink coverage enhancement. For example, LTE NB-IoT can support 160 dB MCL with 20 dB coverage extension and supports 3.75 kHz SCS with increase in primary synchronization signal (PSS), secondary synchronization signal (SSS) and primary broadcast channel (PBCH) repetition and periodicity. The control and data signal can be repeated in the time domain which facilitates a Narrowband physical downlink control channel (NPDCCH) with up to 2048 repetitions and a Narrowband physical uplink shared channel (NPUSCH) Format 1 (UL-SCH) with up to 128 repetitions. Additionally, a Resource Unit (RU) may be defined with longer duration up to 32 ms and NPUSCH format 2 UCI of up to 128 repetitions.

Taking the foregoing considerations into account, embodiments relate to enhancing NR V2X PSFCH to extend coverage to facilitate sideband feedback to meet the needs of the various networking environments and protocols utilizing sideband transmissions. Accordingly, various embodiments define a new PSFCH format including resource configurations, and mechanisms to determine their use as well as signaling formats for utilizing the new PSFCH format(s) of the inventive embodiments. As described herein, the embodiments refer to a long PSFCH format and a short PSFCH format, where the short format refers to existing format 0 design such as those previously discussed and the long PSFCH format 1 of the inventive embodiments to facilitate extension of the sideband feedback in NR to various 3GPP V2X, D2D and/or narrowband networking specifications and conditions. The proposed inventive embodiments related to an extended PSFCH format referred to herein as "PSFCH format 1" or "long PSFCH format"

Acknowledgment and/or negative acknowledgement (ACK/NACK) messages sent over the PSFCH according to certain aspects of the inventive embodiments may now have either a legacy "short PSFCH format" or "PSFCH format 0" or a "long PSFCH format" or PSFCH format 1" to provide needed ACK/NACK feedback and to adjust networking parameters accordingly. In some embodiments, a sequence-based short PSFCH format may be used for sidelink ACK/NACK messaging, where no more than one or two symbols are used for the ACK/NACK message. Alternatively, a long PSFCH format as described by various embodiments may now be used where more than two symbols are used for the ACK/NACK message, up to the size of an entire slot (e.g., up to 14 symbols for a 14-symbol slot structure). In either of the long or short PSFCH formats, the ACK/NACK message may be repeated for each symbol to increase the likelihood of successful reception by the receiving device.

Figure 5:
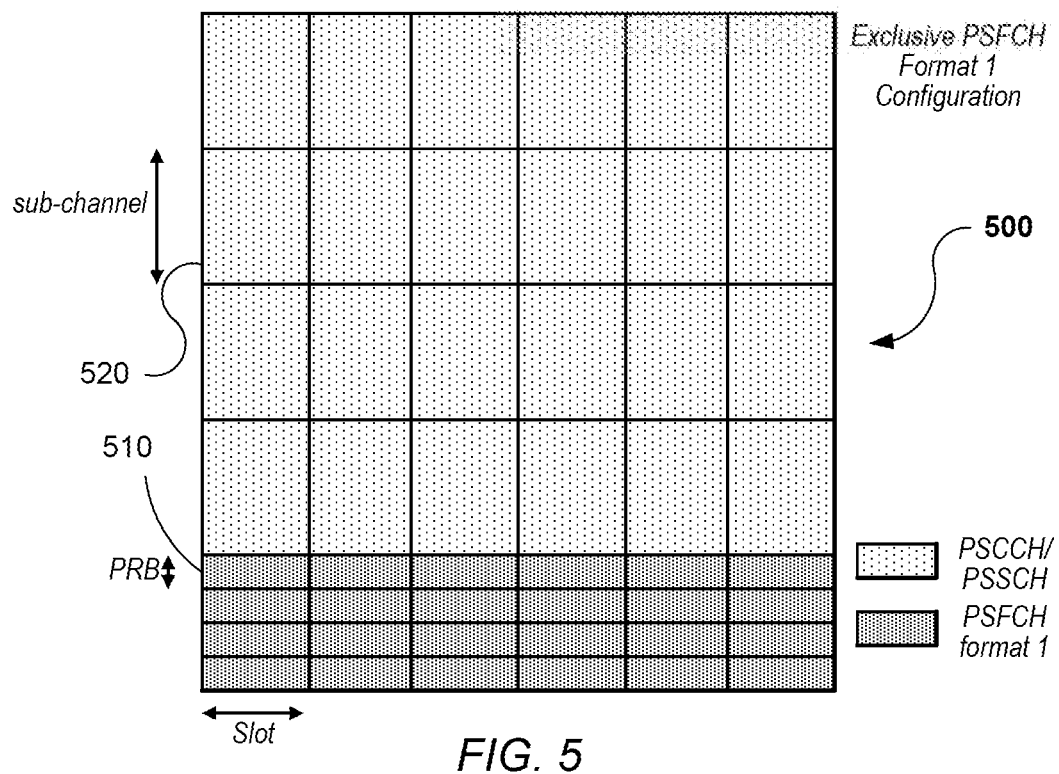
FIGS. 5 and 6 illustrate example embodiments of assigning resources of a resource pool for an exemplary new "long physical sidelink feedback channel (PSFCH) format" according to various embodiments.
Figure 6:
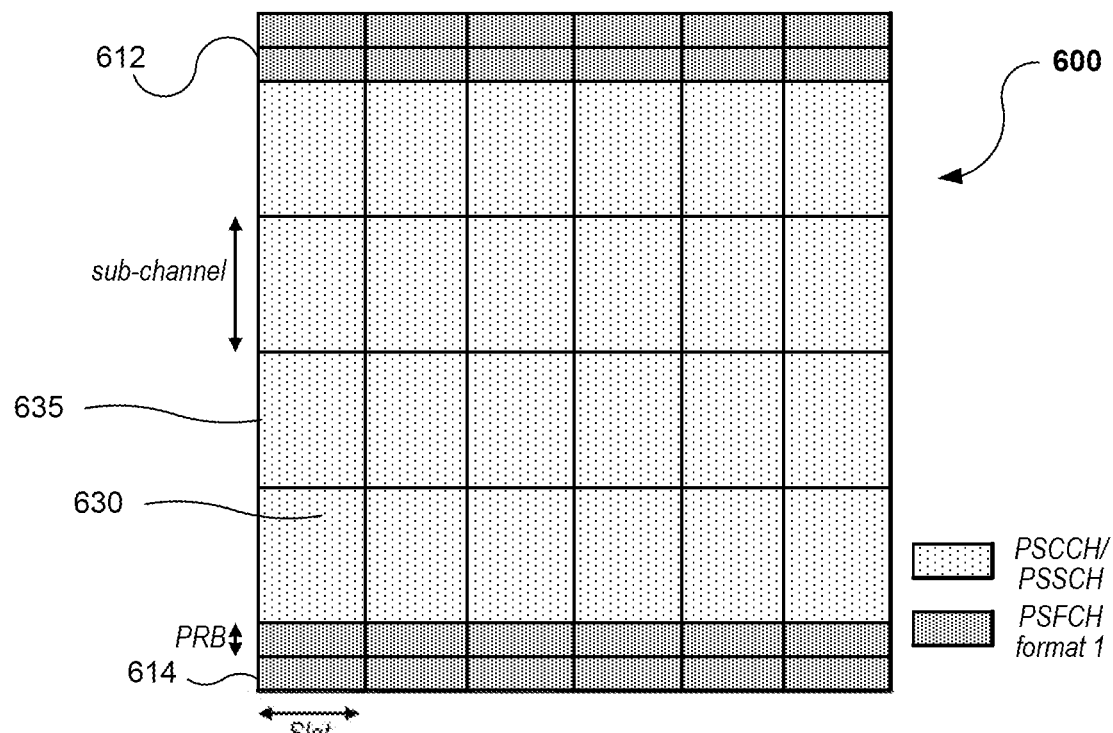

FIGS. 5 and 6

Referring to FIG. 5 and FIG. 6, example resource configurations for the PSFCH format 1 (or long PSFCH format) are shown. In a first example of FIG. 5, a Long PSFCH resource configuration 500 is shown in which a physical uplink control channel PUCCH format 1 is used as the new PSFCH format 1. In one example embodiment, the frequency resources of PSFCH format 1 may be the remaining physical resource blocks (PRBs) 510 of a resource pool 500 which are not used in Release 16 NR V2X. For example, a resource pool 500 configures 65-PRBs 510 and its sub-channel 520 size is 10 PRBs 510. The remaining 5-PRBs are not used in sidelink transmissions and these remainder PRBs 510 may therefore be used as frequency resources for PSFCH ACK/NACK transmissions.

In addition, or alternatively, in certain embodiments, the frequency resources of PSFCH format 1 may be simply allocated as the last several sub-channels 520 of a resource pool 500.

Referring to FIG. 6, in yet other example embodiments, frequency resources utilized for PSFCH format 1 may be at both high PRBs 612 and low PRBs 614 of a resource pool 600. Moreover, PSFCH format 1 resources may be allocated in the middle (not shown) of a resource pool 600 for frequency diversity gain if desirable.

In some embodiments, sidelink control information (SCI) may be transmitted over the physical sidelink control channel (PSCCH) 630 and a data payload may be transmitted over the physical sidelink shared channel (PSSCH) 635. By way of example, the Sidelink Control Information (SCI) may specify the resources to be used for an upcoming PSFCH ACK/NACK message associated with the data payload. In some embodiments, the SCI may specify a particular time, frequency and/or code resource. Typically, the PSFCH resources may be offset from the corresponding PSSCH by 2 or 3 slots (i.e., the PSFCH may be scheduled to occur 2 or 3 slots after the PSSCH) although there is no limitation of the inventive embodiments in this manner.

Figure 7:
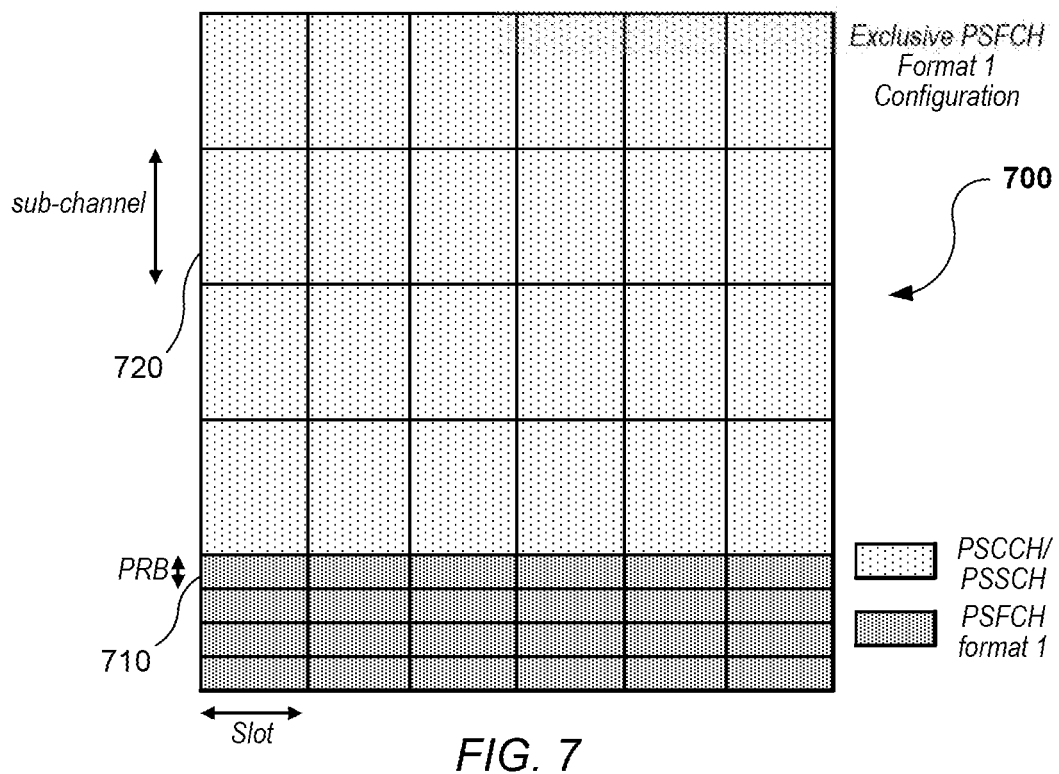
FIGS. 7 and 8 illustrate example configurations for resource assignment for sideband feedback channels according to other embodiments.
Figure 8:
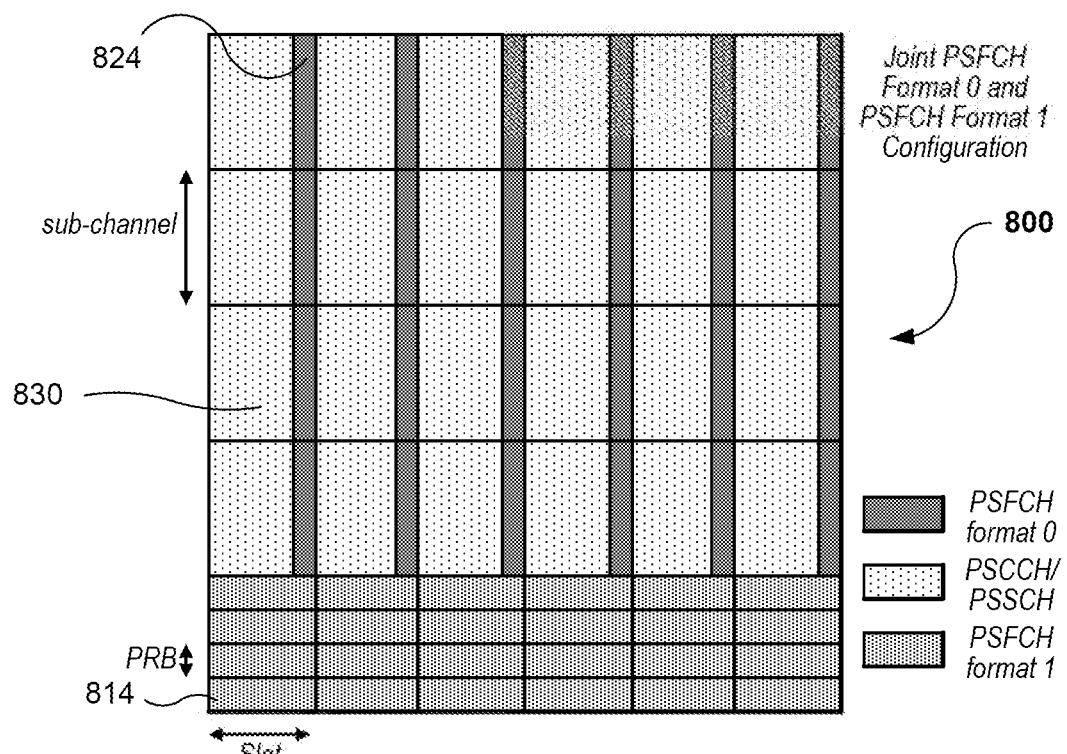

FIGS. 7 and 8

Referring to FIG. 7 and FIG. 8, additional embodiments for resource configuration of PSFCH resources in special case circumstances are shown and will now be described. FIG. 7 illustrates an example embodiment where frequency pool resources 700 are configured exclusively using PSFCH format 1 (long format) resources. The PRBs 710 configured in this embodiment utilize the designated resources of PSFCH format 1, exclusively for ACK/NACK messages. For example, in time resources, repetition of PSFCH format 1 to two consecutive symbols in a time slot enables configuration where the first symbol may be used for automatic gain control (AGC) training, and one symbol is used for GAP (i.e., Tx/Rx switch) right after PSFCH transmission of ACK/NACK message.

In the configuration of frequency resources, only a single physical resource block (PRB) 714, and not the whole sub-channel 730, may be used. If the PSFCH format 0 periodicity is not equal to zero, then PSFCH format 1 resources may be configured.

FIG. 8

FIG. 8 illustrates an example embodiment where BOTH PSFCH format 0 and format 1 resources may be jointly assigned concurrently in the same resource pool 800.

In this embodiment, PSFCH format 1 resources are independently configured to PSFCH format 0 resource configuration. As can be seen, PSFCH format 1 resources may be configured using PRBs 814 for determinations that require the long PSFCH format for ACK/NACK messaging as discussed in regard to previous embodiments, and those using sideband transmissions which conform to legacy PSFCH sub-slot timing, short PSFCH format may be configured using sub-slots 824 within PSCCH and PSSCH subchannels 830. In this manner, PSFCH may be enhanced using flexible and adaptive resource configurations.

FIG. 9

Figure 9:
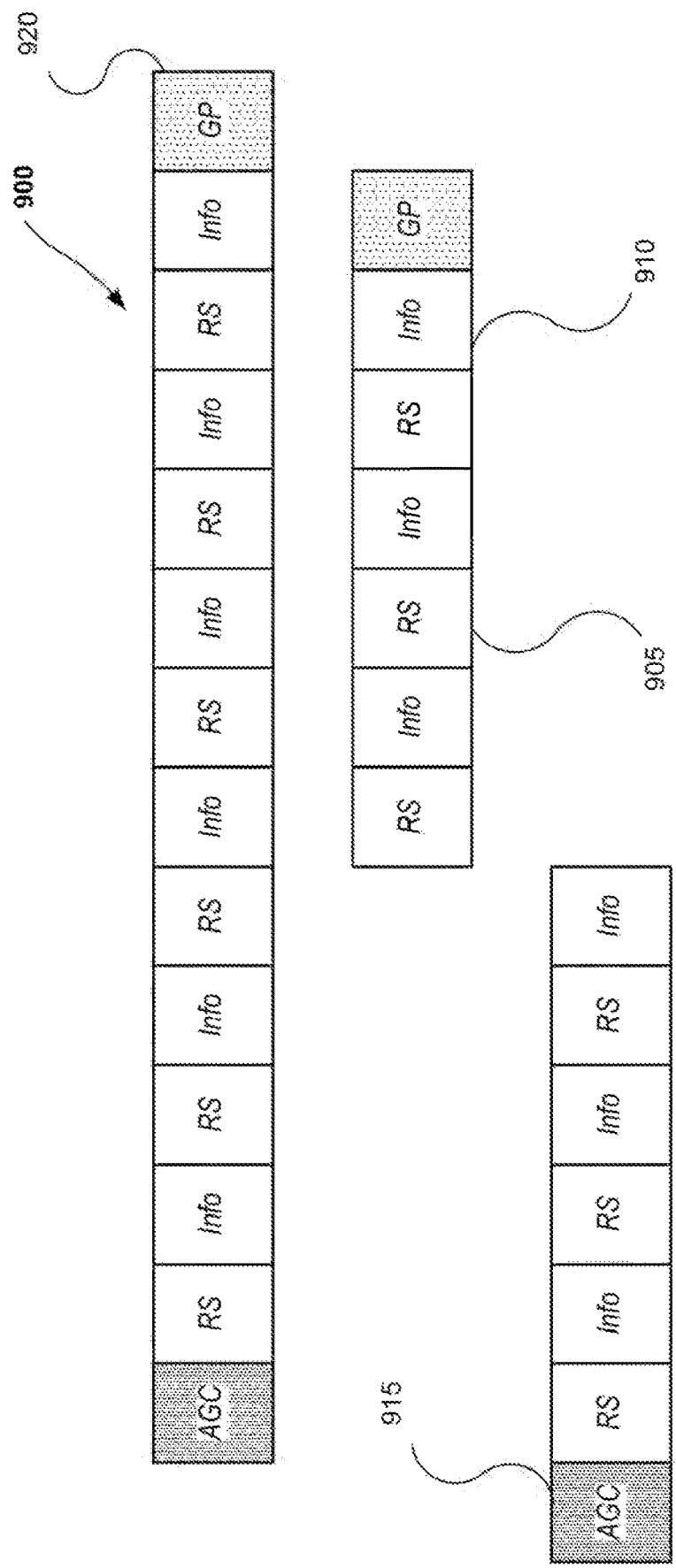
FIG. 9 illustrates an example radio slot content for a long PSFCH format according to various embodiments.

Turning to FIG. 9, an example embodiment is described of the long PSFCH format or PSFCH format 1 content 900. The PSFCH format 1 may contain 1 or 2 bit information 905, 910 on the hybrid automatic repeat request HARQ acknowledgement ACK. In this example embodiment, the long PSFCH format may use only one slot in the time domain and one resource block (RB) in the frequency domain. An entire slot may be used for PSFCH transmissions with exception of AGC symbol 915 and a GAP symbol 920 and slot is up to length-6 OCC is applied. In certain embodiments, intra-slot frequency hopping is supported for PSFCH format 1.

Long PSFCH Format Resource Determination

Figure 10:
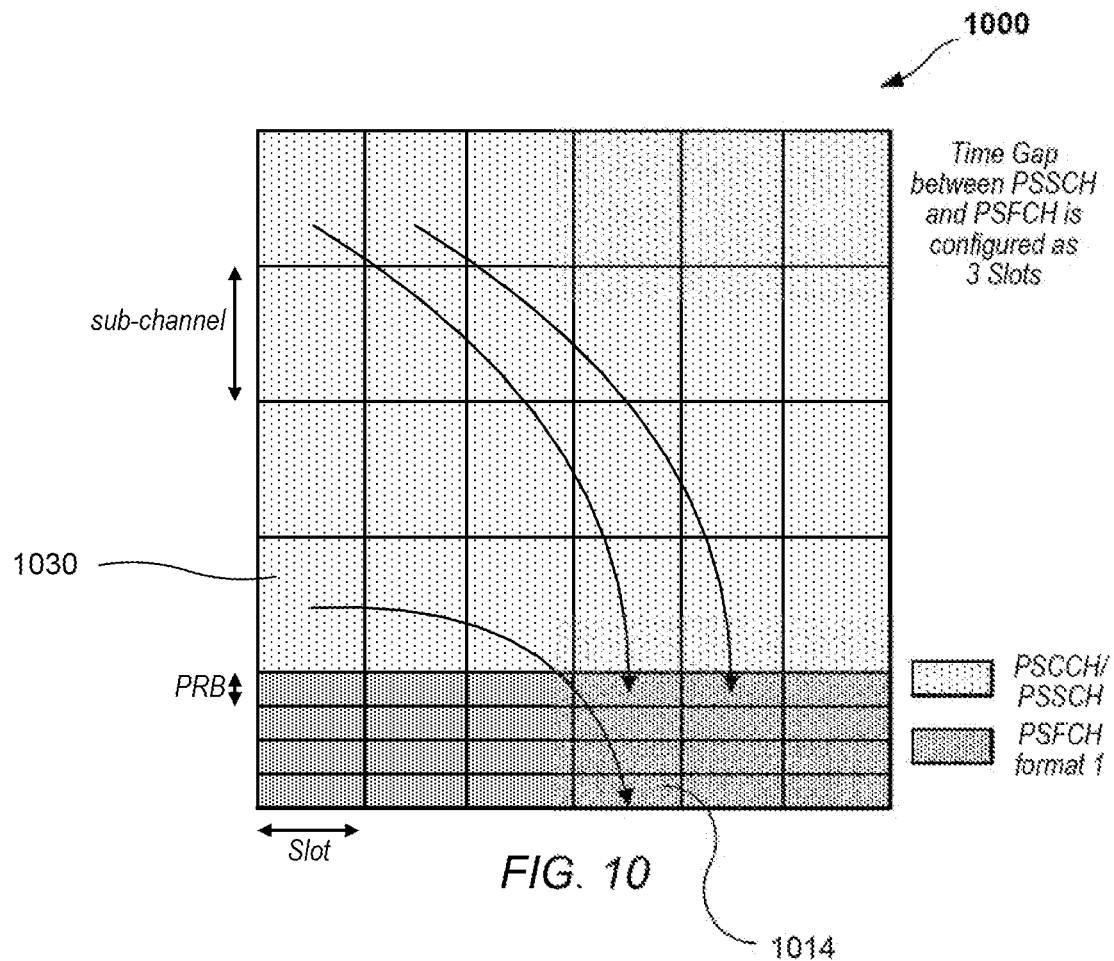
FIG. 10 illustrates example one-to-one resource mapping between PSSCH subchannels and PSFCH format 1 slots with a time gap of 3 slots.

Resource mapping between the PSSCH 1030 and PSFCH format 1 1014 will now be described in reference to resource pool 1000 of FIG. 10. In certain embodiments the number of sub-channels is equal to the number of PSFCHs in a slot and there is a one-to-one mapping in the frequency domain. For example, if a PSSCH uses i-th sub-channel, then the i-th PSFCH may be used for HARQ feedback. In certain embodiments, a time gap is maintained between PSSCH 1030 and PSFCH format 1 1014. Such a time gap may be (pre)configured per resource pool or may be pre-defined. This time gap may be indicated in SCI associated with PSSCH.

One-to-one mapping may be suitable for unicast or groupcast HARQ option 1. For groupcast HARQ option 2, more resources may be needed. In various embodiments, Code domain (OCC) may be applied to support multiple PSFCHs and more than one PSFCH time/frequency resource is associated with one PSSCH resource. In alternative embodiments, the number of sub-channels does not have to be equal to the number of PSFCHs in a slot.

Figure 11:
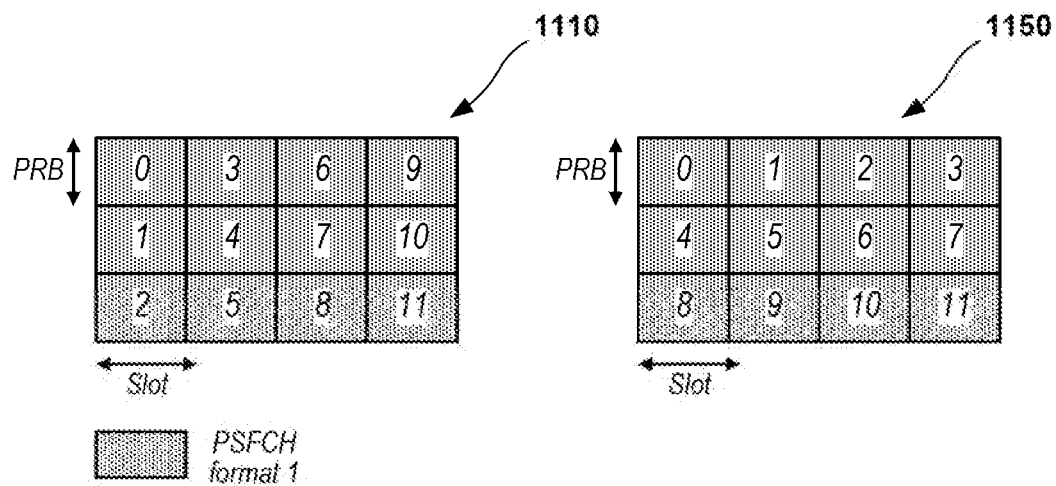
FIG. 11 illustrates example embodiments of PSFCH indexing when the number of subchannels of the PSSCH does not equal the number of PSFCH in a slot.

FIG. 11: Index the PSFCH Resources

Referring to FIG. 11, two options for indexing the PSFCH resources include indexing by frequency first and time second, where PSFCH resource index 1110 depends on slot number. For example, PSFCH resources in the i-th slot number are indices by [(i−1)*N,i*N−1], where N is the number PSFCH resources per slot.

For a PSSCH transmission in slot j, the corresponding PSFCH resource index is larger than (j+k−1)*N, where k is the configured minimum slot offset between PSSCH and PSFCH. FIG. 11 further shows a PSFCH resource index 1150 where PSFCH is indexed by time first and frequency second. In other embodiments PSFCH may be indexed (not shown) by frequency first, time second and code third.

Signaling of Short and Long PSFCH Formats

Both short PSFCH format resources and long PSFCH format resources are configured. The usage of short PSFCH format resources or long PSFCH format resources may depend on several factors. For example, in Groupcast session configuration and communication range requirement (Groupcast HARQ option 1), if communication range requirement is larger than a threshold, then long PSFCH format may be used with configured long PSFCH resources and if communication range requirement is smaller than a threshold, then short PSFCH format may be used with configured short PSFCH resources. In the various embodiments, thresholds may be (pre)configured per resource pool, or per resource pool per data priority. For example, in a Unicast PC5-RRC configuration, the data priority may provide indication. If data priority is higher than a threshold, then the long PSFCH format may be used with configured long PSFCH resources, and if data priority is lower than a threshold, then short PSFCH format may be used with configured short PSFCH resources. Again, thresholds may be (pre)configured per resource pool, or per resource pool per data priority.

In some embodiments, the usage of short PSFCH format resources or long PSFCH format resources may depend on SL-RSRP measurement at Rx UE. For example, if measured SL-RSRP is higher than a threshold, then short PSFCH format may be used, whereas, if measured SL-RSRP is lower than a threshold, then long PSFCH format may be used. The SL-RSRP threshold may be (pre)configured per resource pool, or per resource pool per data priority, or based on MAC CE indication.

In L3-filtered sidelink RSRP reporting from Rx UE to Tx UE for open loop power control, if the reported sidelink RSRP is larger than a threshold, then Tx UE may decide/indicate short PSFCH format. On the other hand, if the reported sidelink RSRP is smaller than a threshold, then Tx UE may decide/indicate long PSFCH format.

Sidelink CSI feedback from Rx UE to Tx UE for adaptive modulation and coding (AMC) may be an indicator. For example, if reported CQI is lower than a level, then Tx UE may decide/indicate long PSFCH format and if reported CQI is higher than a level, then Tx UE may decide/indicate short PSFCH format.

In other embodiments, the usage of short PSFCH format resources or long PSFCH format resources may depend on SCI indication. For example, SCI stage 2 may indicate whether long or short PSFCH format is used.

For SCI format 2-A or SCI format 2-B, an explicit field can be used to indicate whether a long or short PSFCH format can be used. For example, SCI format 2-A reuses a "Cast type indicator" field to indicate long or short PSFCH format. Moreover, SCI format 2-B can reuse the "communication range requirement" field to indicate long or short PSFCH format.

In one embodiment, the location information in sidelink unicast can be applied to make a determination. SCI format 2-B can be applied to both unicast or groupcast HARQ feedback option 1. For unicast, the Tx UE's location (e.g., zone ID) is transmitted. "Communication range requirement" may or may not be valid for sidelink unicast. Rx UE calculates the Tx-Rx distance, based on its own location. If the distance is larger than a threshold, then long PSFCH format is used. Otherwise, short PSFCH format is used. If Rx UE does not have its own location, then the long or short PSFCH format can be determined based on data priority level. The usage of short PSFCH format resources or long PSFCH format resources may depend on applying location information in sidelink unicast.

A new SCI format (e.g., SCI format 2-C) can be applied to support the long PSFCH format. In one embodiment, SCI format-based determination of the PSFCH format is performed. If Rx UE receives this SCI format, it automatically uses the long PSFCH format, whereas if Rx UE receives legacy SCI formats (e.g., SCI format 2-A or 2-B), it automatically uses the short PSFCH format.

In another embodiment, distance-based determination may determine the PSFCH format from location information included in the SCI format. More accurate geo-location information (other than zone ID) may also be used.

When the Payload may be more than 12 bits, "Communication range requirement" may not be included in the new SCI format. Therefore, the Rx UE may calculate the Tx-Rx distance, based on its own location. If the distance is larger than a threshold, then the long PSFCH format may be used. Otherwise, the short PSFCH format may be used.

In one embodiment, if the Rx UE does not have its own location, then it may determine the long or short PSFCH format based on a data priority level. Any of these examples or a combination may be set to make the determination which PSFCH format to use.

Spectrum Sensing for Mode 2

NR SL Release 16 support two modes of operation for V2X packet transmission: 1) NR Mode-1, where gNB schedules SL resources, requiring UE to get scheduling decisions from gNB every time a UE initiates a V2X communication over SL in network coverage; and 2) NR Mode-2, where a V2X UE performs autonomously resource selection from the configured resource set, a geographical zone concept can be used to dimension resource pools in an effort to avoid collision for V2X message transmission that enables V2X UE(s) to communicate both inside/outside network coverage.

In NR SL design, Physical Sidelink Control Channel (PSCCH) carrying Sidelink Control Information (SCI) may be time multiplexed with the associated Physical Sidelink Shared Channel (PSSCH). NR V2X may split the content of the SCI payload into two parts, wherein the first part of the SCI carries information related to sensing operation of the V2X UE. The first SCI payload broadcasted to the surrounding UEs may carry information related to QoS priority of data, occupied resource blocks, resource reservation interval etc., as part of reducing the decoding complexity during sensing operation. The second SCI transmission may carry information related data decoding of Physical SL Shared Channel (PSSCH). The Physical Sidelink Feedback Channel (PSFCH) Format 0, or the short format, may be designed to carry SL-HARQ feedback occupies last one or two OFDM symbol(s) of a slot. The gNB may configure resource pool(s) with the flexibility of configuring with or without PSFCH resources. Sidelink MAC Control Element (MAC-CE) designed to carry aperiodic SL Channel State Information report from RX UE to TX UE contains information related to Channel Quality Information for link adaptation and Rank Indicator to enable more than one layer transmission. For NR mode-1, gNB transmits Downlink Control Information (DCI) that carries information related to SLHARQ feedback report to gNB thereby requesting retransmission resource of a transport block (TB). DCI contains feedback timing and the corresponding uplink resources required by the TX UE for feedback reporting.

Figure 12:
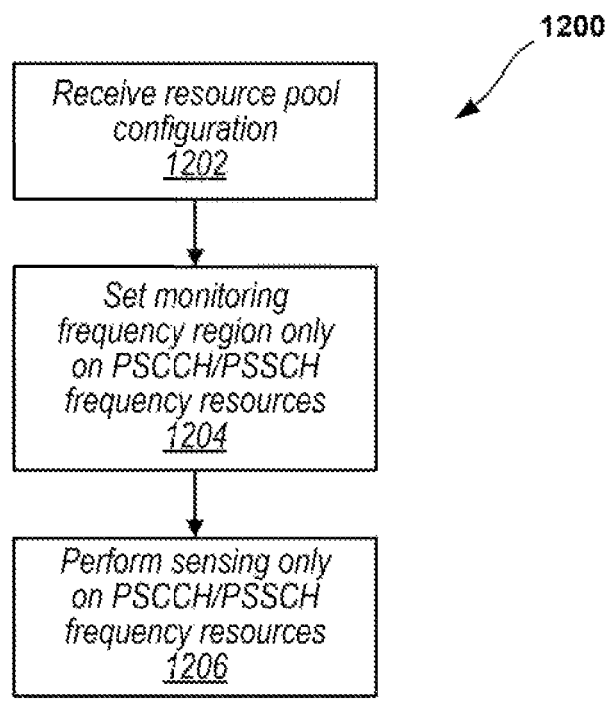
FIG. 12 illustrates an example embodiment for spectrum sensing in mode 2 for determination of PSFCH.

FIG. 12 Sensing-Based Determination of HARQ Format

In reference to FIG. 12, a method 1200 for determining whether to use the short or long format for PSFCH is described. Here, the determination whether to use PSFCH format 0 or format 1 for feedback in sideband transmissions is generally performed based on evaluation of the frequency resources received from other gNBs or UEs. For example, a UE may receive 1202 resource pool configuration in the sideband control channel or PSCCH from received signals when decoding. That is, a receiving UE may monitor 1204 a received signal for determination of which type of feedback format to use based on the physical characteristics of actual signals received, the QoS priority, what resource blocks are occupied or indicators in the received signal as described above.

Thus, in various embodiments, there are two stages of sideband control information (SCI) relevant to the determination of which PSFCH feedback format to use. The first part of the SCI carries information in its payload related to sensing operation 1200 of the V2X UE. The first stage SCI is broadcast to surrounding UEs as part of the PSCCH and may carry information related to QoS priority of data, occupied resource blocks, resource reservation interval, etc., as part of reducing the decoding complexity during sensing operation 1200.

As described above, there are many types indications a UE may use for determining to use PSFCH Format 0 or Format 1 feedback. For example, SCI information in the payload of the control channel may be used for this purpose, and a UE may set 1204 the monitoring frequency region only of the PSCCH/PSSCH frequency resources in a received signal to sense in determining which sideband feedback format and what resources in a resource pool to utilize. Thus in one embodiment, at 1206 the UE may perform sensing only on PSCCH/PSSCH frequency resources of a received signal and therefore, the UE does not look at long PSFCH resources or other signal components, just the PSCCH and PSSCH resources, in sensing which feedback format to use.

In the various embodiments, some of the elements of the methods shown may be performed concurrently, in a different order than shown, may be substituted for by other method elements, or may be omitted.

In the following, further exemplary embodiments are provided.

One set of embodiments may include an apparatus, comprising: a processor configured to cause a first wireless device to configure resources for physical sidelink feedback channels (PSFCHs) described above. Moreover, determination of whether to use PSFCH format 0 or PSFCH format 1 and/or how to signal which format to use may also, or alternatively, be performed by a processor configured to cause the first wireless device to accomplish those tasks individually, or in combination, according to the examples previously described.

A further exemplary embodiment may include a method, comprising: performing, by a wireless device, any or all parts of the preceding examples.

Another exemplary embodiment may include a device, comprising: an antenna; a radio coupled to the antenna; and a processor operably coupled to the radio, wherein the device is configured to perform or execute any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples. Still another exemplary set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising circuitry configured to cause a first wireless device to:
configure radio resources for a physical sidelink feedback channel (PSFCH) to transmit acknowledgment (ACK) or non-acknowledgement (NACK) messages over a sidelink feedback channel using a long PSFCH format resource configuration comprising assigning frequency resources for use in a long PSFCH format from remaining unused physical resource blocks (PRBs) of a resource pool used for sidelink transmission of a physical sidelink control channel (PSCCH) and a physical sidelink shared channel (PSSCH) that remain unused in PSCCH or PSSCH transmissions because a number of PRBs in the resource pool is not evenly divisible by a sub-channel size of the resource pool.

2. The processor of claim 1,
wherein the processor is further configured to cause the first wireless device to:
determine resource mapping between the PSSCH and the long PSFCH format configuration by:
when a number of sub-channels for the PSSCH is equal to a number of PSFCHs in a slot, use one-to-one mapping in a frequency domain such that, when a PSSCH uses i-th sub-channels, then an i-th PSFCH is used for hybrid automatic repeat request (HARQ) feedback; and
when the number of sub-channels for the PSSCH is not equal to the number of PSFCHs in the slot, indexing the PSFCH resources by one of frequency first, time second indexing, time first, frequency second indexing, or frequency first, time second and code indexing third.

3. The processor of claim 1,
wherein the long PSFCH format is referred to as PSFCH format 1 and comprises 1 or 2 bit information on HARQ ACK and wherein the PSFCH format 1 fits in a single slot of a radio frame in a time domain and is one PRB in a frequency domain.

4. The processor of claim 3,
wherein intra-slot frequency hopping of PSFCH format 1 is supported.

5. The processor of claim 1,
wherein the processor is further configured to cause the first wireless device to:
prior to configuring radio resources, determine that the long PSFCH format resource should be used based on information included in a sidelink control information (SCI) payload of the physical sidelink control channel (PSCCH), wherein the resource pool is configured to include a number of PRBs in the physical sidelink feedback channel (PSFCH) that is equal to a number of subchannels in the physical sidelink shared channel (PSSCH), and wherein the resource pool includes a fixed time gap between each subchannel of the PSSCH and a corresponding PSFCH PRB.

6. The processor of claim 1,
wherein the processor is further configured to cause the first wireless device to:
prior to configuring radio resources, identify that the long PSFCH format should be used from at least one of:
a groupcast session configuration;
a communication range requirement;
a unicast PC5-radio resource control (RRC) configuration;
a data priority;
a sidelink reference signal received power (SL-RSRP) measurement at the wireless device;
a layer 3 (L3)-filtered sidelink RSRP reporting received by the wireless device;
a sidelink channel quality indicator (CQI) feedback received by the wireless device; or
an indicator present in a sidelink control information payload from the physical sidelink control channel of the resource pool.

7. The processor of claim 6,
wherein the processor is further configured to cause the first wireless device to:
prior to configuring radio resources, receive a signal to identify that the long PSFCH format should be used from sidelink control information in the physical sidelink control channel (PSCCH) and how to configure the long PSFCH format in the resource pool.

8. A wireless communication device comprising:
at least one antenna to radiate or receive electromagnetic signals of a wireless communications network said;
a radio coupled to the at least one antenna; and
a processor coupled to the radio; and
wherein the processor is configured to cause the wireless communication device to:
configure radio resources for a physical sidelink feedback channel (PSFCH) to transmit hybrid automatic repeat request (HARQ) messages using a long PSFCH format, wherein radio resources are configured from remaining unused physical resource blocks (PRBs) of a resource pool used for sidelink transmission of a physical sidelink control channel (PSCCH) and a physical sidelink shared channel (PSSCH) that remain unused in PSCCH or PSSCH transmissions because a number of PRBs in the resource pool is not evenly divisible by a sub-channel size of the resource pool.

9. The wireless communication device of claim 8,
wherein the processor is further configured to cause the wireless device to determine resource mapping between the PSSCH and the long PSFCH format configuration by:
when a number of sub-channels for the PSSCH is equal to a number of PSFCHs in a slot, use one-to-one mapping in a frequency domain such that, when a PSSCH uses i-th sub-channels, then an i-th PSFCH is used for hybrid automatic repeat request (HARQ) feedback; and
when the number of sub-channels for the PSSCH is not equal to the number of PSFCHs in the slot, indexing the PSFCH resources by one of frequency first, time second indexing, time first, frequency second indexing, or frequency first, time second and code indexing third.

10. The wireless communication device of claim 8,
wherein the long PSFCH format is referred to as PSFCH format 1 and comprises 1 or 2 bit information on HARQ ACK and wherein the PSFCH format 1 fits in a single slot of a radio frame in a time domain and is one PRB in a frequency domain.

11. The wireless communication device of claim 10,
wherein intra-slot frequency hopping of PSFCH format 1 is supported.

12. The wireless communication device of claim 9,
wherein the processor is further configured to cause the wireless device to:
determine that a first acknowledgment message is to be communicated according to a short PSFCH format, referred to as PSFCH format 0; and
determine that a second acknowledgment message is to be communicated according to the long PSFCH format, referred to as PSFCH format 1; and
wherein if PSFCH format 0 periodicity is not equal to 0, the PSFCH format 1 resources may be configured for sidelink transmission exclusively with PSFCH format 0 resources.

13. The wireless communication device of claim 8,
wherein the processor is further configured to cause the wireless device to:
assign PSFCH format 1 resources jointly with PSFCH format 0 resources in the same resource pool used for sidelink transmission of a physical sidelink control channel (PSCCH) and a physical sidelink shared channel (PSSCH).

14. The wireless communication device of claim 13,
wherein the resources assigned PSFCH format 1 comprise a plurality of PRBs of the resource pool and wherein the resources assigned PSFCH format 0 comprise a plurality of subslots in subchannels of the resource pool.

15. A method of communicating in a wireless network using sidelink transmissions with sidelink feedback forward error correction (FEC), the method comprising:
determining to use a long physical sidelink feedback channel (PSFCH) format, PSFCH format 1, that specifies radio resources to provide acknowledgement (ACK) or negative-acknowledgement (NACK) feedback indication to a transmitting device using sideband transmissions based on a predetermined criterion; and
configuring radio resources for the PSFCH format 1 physical sidelink feedback channel (PSFCH) by assigning frequency resources for use in the long PSFCH format 1 from remaining unused physical resource blocks (PRBs) of a resource pool used for sidelink transmission of a physical sidelink control channel (PSCCH) and a physical sidelink shared channel (PSSCH) that remain unused in PSCCH or PSSCH transmissions because a number of PRBs in the resource pool is not evenly divisible by a sub-channel size of the resource pool.

16. The method of claim 15,
wherein the PSFCH format 1 comprises information sized to fit within a radio frame slot and comprising: an automatic gain control, a repeatable 1 or 2 bit information on hybrid automatic repeat request (HARQ) acknowledgement (ACK), and a GAP and wherein the PSFCH format 1 fits is one PRB in a frequency domain.

17. The method of claim 15,
wherein if a PSFCH format 0 periodicity is not equal to 0, PSFCH format 1 resources are configured exclusively with PSFCH format 0 resources; or PSFCH format 1 resources are independently configured to PSFCH format 0 resource configuration.

18. The method of claim 16, further comprising:
resource mapping of HARQ feedback in the PSFCH format 1 resource configuration between a physical sidelink shared channel (PSSCH) present in a plurality of subchannels of a preconfigured resource pool; and
when a number of PSSCH sub-channels is equal to a number of PSFCH in a slot, performing one-to-one mapping of the PSFCH in the frequency domain wherein a time gap exists between corresponding HARQ feedback slots and PSSCH subchannels.

19. The method of claim 18,
wherein the time gap is preconfigured per resource pool PSFCH format 1 resources may be configured exclusively with PSFCH format 0 resources.

20. The method of claim 17,
wherein a number of sub-channels of PSSCH does not equal a number of PSFCH feedback per slot, and wherein in mapping resources comprises indexing the PSFCH resources by slot, wherein an i-th slot number are indices by [(i−1)*N,i*N−1], where N is the number of PSFCH resources per slot.

* * * * *